G. B. FIELD.
Steam-Plow.

No. 22,496.

Patented Jan. 4, 1859.

Inventor:
G. B. Field

UNITED STATES PATENT OFFICE.

GEORGE B. FIELD, OF ST. LOUIS, MISSOURI.

IMPROVEMENT IN SPADING-MACHINES.

Specification forming part of Letters Patent No. 22,496, dated January 4, 1859.

*To all whom it may concern:*

Be it known that I, GEORGE B. FIELD, of the city and county of St. Louis, State of Missouri, have invented a new and useful Improvement in Machinery for Cultivating the Soil, which I call "Field's Shoveling-Machine;" and I do hereby declare that the following is a full and clear description of the construction and operation of the same, reference being had to the annexed drawings, making a part of this specification, in which—

Figure 1:
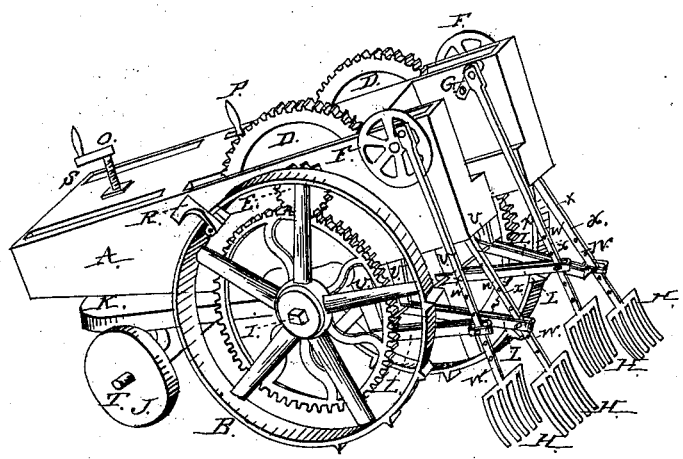
Figure 2:
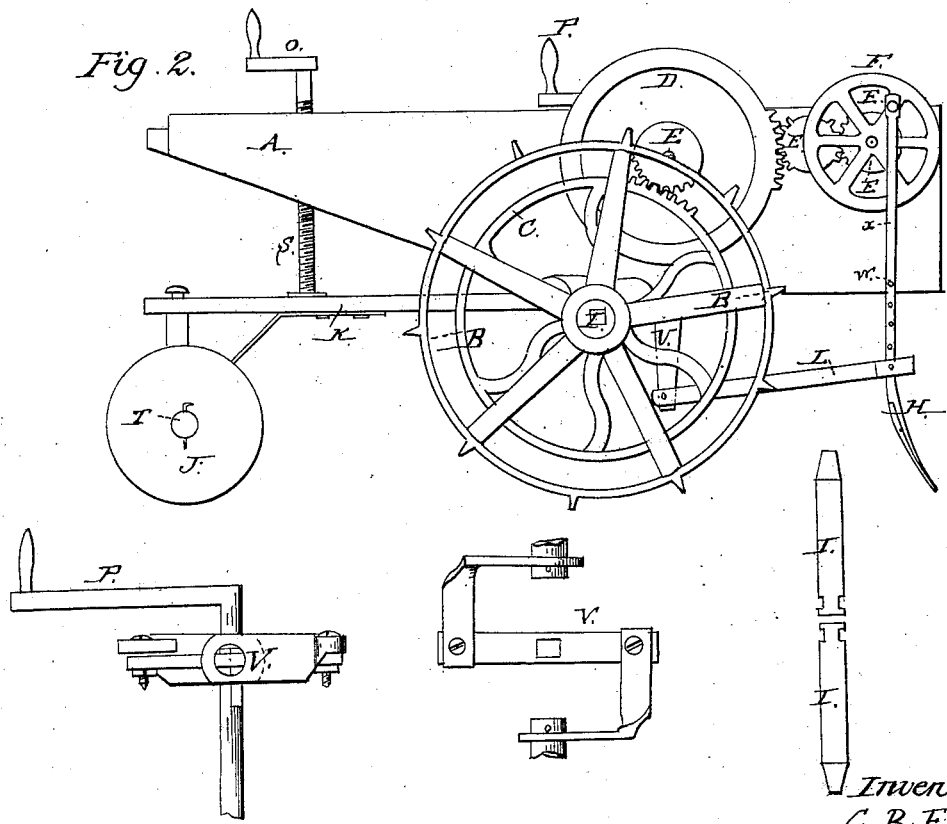

Figure 1 is a perspective view; Fig. 2, a longitudinal elevation.

Letter A is the frame.

B B are the driving-wheels.

D D and C C are spur-wheels.

E E are pinions.

F F are fly-wheels, upon which the upper end of the shovel is attached and driven by a single crank-arm.

H are the shovels; X, the handles; L, the adjustable guide-arms which govern the movement of the shovels.

W are holes in the shovel-handles X for raising or lowering the guide-arms so as to regulate the motion of the shovels.

U are the standards, to which one end of the guide-arms is attached.

G are the single cranks.

S and O are the screw and handle which is to raise or lower the frame, to throw the shovels out of the ground in turning.

P and V represent the arrangement for throwing pinion E and spur-wheel C out of and in gear.

I I represent the axle, which is in two parts and connected to the carriage by means of boxes, in order to give greater ease in guiding and turning the machine.

K is the platform, one end of which is attached to the axle; the other rests upon a truck. J J, truck-wheels; T, end of truck-axle.

R is a wing, showing the way in which they are fastened on the driving-wheel in order to secure traction on case of using cattle or horses for propelling, but in case of steam-power are unnecessary.

What I claim is—

Propelling the shovels H by means of single cranks G, attached to handles X and guided by adjustable arms or levers L, so that the lower end of the shovels, when in motion, shall run in separate lines or furrows, the whole being constructed, arranged, and operating substantially as herein described.

GEORGE B. FIELD.

Attest:
 JOHN S. HOLLINGSHEAD,
 PAUL STEVENS.